United States Patent
Chen et al.

(10) Patent No.: US 8,910,091 B2
(45) Date of Patent: *Dec. 9, 2014

(54) METHOD, PROGRAM PRODUCT AND APPARATUS FOR PERFORMING DOUBLE EXPOSURE LITHOGRAPHY

(75) Inventors: Jang Fung Chen, Cupertino, CA (US); Duan-Fu Stephen Hsu, Fremont, CA (US); Douglas Van Den Broeke, Sunnyvale, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/401,820

(22) Filed: Feb. 21, 2012

(65) Prior Publication Data
US 2013/0055171 A1    Feb. 28, 2013

Related U.S. Application Data

(63) Continuation of application No. 12/691,552, filed on Jan. 21, 2010, now Pat. No. 8,122,391, which is a continuation of application No. 11/402,273, filed on Apr. 12, 2006, now Pat. No. 7,681,171.

(60) Provisional application No. 60/670,285, filed on Apr. 12, 2005.

(51) Int. Cl.
*G06F 17/50*    (2006.01)
*G03F 7/20*    (2006.01)
*G03F 1/00*    (2012.01)

(52) U.S. Cl.
CPC ............ *G03F 1/144* (2013.01); *G03F 7/70466* (2013.01)
USPC .................. 716/53; 716/50; 716/51; 716/52; 716/54; 716/55; 430/5; 430/30

(58) Field of Classification Search
USPC ....................... 716/50–56; 430/5, 30
See application file for complete search history.

(56) References Cited

U.S. PATENT DOCUMENTS

5,357,311 A    10/1994  Shiraishi
5,472,814 A  * 12/1995  Lin .................................. 430/5

(Continued)

FOREIGN PATENT DOCUMENTS

EP    1286218    2/2003
EP    1349002    10/2003

(Continued)

OTHER PUBLICATIONS

European Search Report issued in corresponding European Patent Application No. EP 06252050.7-2222, dated Jul. 27, 2006.

(Continued)

*Primary Examiner* — Nha Nguyen
(74) *Attorney, Agent, or Firm* — Pillsbury Winthrop Shaw Pittman LLP

(57) ABSTRACT

A method of generating complementary masks based on a target pattern having features to be imaged on a substrate for use in a multiple-exposure lithographic imaging process is disclosed. The method includes defining an initial H-mask and an initial V-mask corresponding to the target pattern; identifying horizontal critical features in the H-mask and vertical critical features in the V-mask; assigning a first phase shift and a first percentage transmission to the horizontal critical features, which are to be formed in the H-mask; and assigning a second phase shift and a second percentage transmission to the vertical critical features, which are to be formed in the V-mask. The method further includes the step of assigning chrome to all non-critical features in the H-mask and the V-mask.

13 Claims, 16 Drawing Sheets

(56) References Cited

U.S. PATENT DOCUMENTS

| | | | |
|---|---|---|---|
| 6,487,712 B1 * | 11/2002 | Kim | 716/55 |
| 6,518,180 B1 | 2/2003 | Fukuda | |
| 6,851,103 B2 | 2/2005 | Van Den Broeke et al. | |
| 6,951,701 B2 | 10/2005 | Hsu et al. | |
| 7,026,081 B2 | 4/2006 | Van der Broeke et al. | |
| 7,138,212 B2 | 11/2006 | Hsu et al. | |
| 7,246,342 B2 | 7/2007 | Hsu et al. | |
| 7,393,613 B2 * | 7/2008 | Dettmann et al. | 430/5 |
| 7,399,559 B2 | 7/2008 | Van der Broeke et al. | |
| 7,514,183 B2 | 4/2009 | Hsu et al. | |
| 7,523,438 B2 | 4/2009 | Hsu et al. | |
| 7,549,140 B2 | 6/2009 | Van Den Broeke et al. | |
| 7,666,554 B2 | 2/2010 | Hsu et al. | |
| 7,725,872 B2 | 5/2010 | Hsu et al. | |
| 2002/0166107 A1 | 11/2002 | Capodieci et al. | |
| 2003/0073013 A1 | 4/2003 | Hsu et al. | |
| 2004/0003368 A1 * | 1/2004 | Hsu et al. | 716/19 |
| 2004/0010768 A1 | 1/2004 | Toublan et al. | |
| 2004/0010770 A1 | 1/2004 | Van Den Broeke et al. | |
| 2004/0142252 A1 | 7/2004 | Skrobis et al. | |
| 2004/0168147 A1 * | 8/2004 | Dai et al. | 716/19 |
| 2005/0102648 A1 | 5/2005 | Hsu et al. | |
| 2005/0125765 A1 | 6/2005 | Van Den Broeke et al. | |
| 2005/0186491 A1 | 8/2005 | Hsu et al. | |
| 2005/0196682 A1 | 9/2005 | Hsu et al. | |
| 2005/0214651 A1 | 9/2005 | Wu | |
| 2007/0214448 A1 | 9/2007 | Hsu et al. | |

FOREIGN PATENT DOCUMENTS

| | | |
|---|---|---|
| EP | 1385052 | 1/2004 |
| EP | 1420294 | 5/2004 |
| EP | 1530084 | 5/2005 |
| JP | 04-273428 | 9/1992 |
| JP | 07-273013 | 10/1995 |
| JP | 2003-178966 | 6/2003 |
| JP | 2003-295413 | 10/2003 |
| JP | 2004-133427 | 4/2004 |
| JP | 2004-177968 | 6/2004 |
| JP | 2005-141242 | 6/2005 |
| WO | WO 00/25181 | 5/2000 |

OTHER PUBLICATIONS

European Search Report issued in corresponding European Patent Application No. EP 06252050.7-1226, dated Feb. 20, 2008.
Sergei V. Postnikov et al., "Assessment of Complementary Double Dipole Lithography for 45nm and 32nm Technologies," Mentor Graphics, pp. 1-8 (2005).
M. Burkhardt et al., "Dark Field Double Dipole Lithography (DDL) for Back-End-of-Line Processes," Optical Microlithography XX, Proc. of SPIE, vol. 6520, pp. 1-10 (2007).
Sho-Shen Lee et al., "Manufacturing Implementation of 32nm SRAM Using ArF Immersion with RET," Optical Microlithography XXI, Proc. of SPIE, vol. 6924, pp. 1-10 (2008).
Takashi Adachi et al., "45-32nm node photomask technology with water immersion lithography," Photomask Technology, Proc. of SPIE, vol. 6349, pp. 1-10 (2006).
Stephen Hsu et al., "Dark Field Double Dipole Lithography (DDL) for 45nm node and beyond," Photomask and Next-Generation Lithography Mask Technology XIII, Proc. of SPIE, vol. 6283, pp. 1-12 (2006).
Stephen Hsu et al., "Double Dipole Lithography for 65nm node and beyond: a technology readiness review," Photomask and Next-Generation Lithography Mask Technology XI, Proc. of SPIE, vol. 5446, pp. 481-498 (2004).
Se-Jin Park et al., "OPC Optimization for Double Dipole Lithography and Its Application on 45nm Node with Dry Exposure," Optical Microlithography XXI, Proc. of SPIE, vol. 6924, pp. 1-8 (2008).
K. Lai et al., "32 NM Logic Patterning Options with Immersion Lithography," Optical Microlithography XXI, Proc. of SPIE, vol. 6924, pp. 1-11 (2008).
J. Andres Torres et al., "Alternatives to Alternating Phase Shift Masks for 65nm," Mentor Graphics Corporation, 22$^{nd}$ Annual BACUS Symposium on Photomask Technology, Proc. of SPIE, vol. 4889, pp. 540-550 (2002).
Michael Hsu et al., "Full-chip Manufacturing Reliability Check Implementation for 90nm and 65nm Nodes Using CPL™ and DDL™," Photomask and Next-Generation Lithography Mask Technology XI, Proc. of SPIE, vol. 5446, pp. 402-413 (2004).
Stephen Hsu et al., "Double Exposure Technique for 45nm and Beyond," 25th Annual BACUS Symposium on Photomask Technology, Proc. of SPIE, vol. 5992, pp. 59921Q-1-59921Q-16 (2005).

* cited by examiner

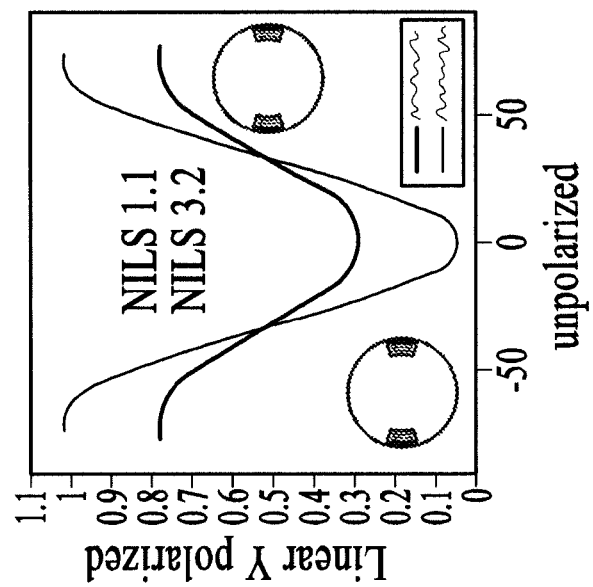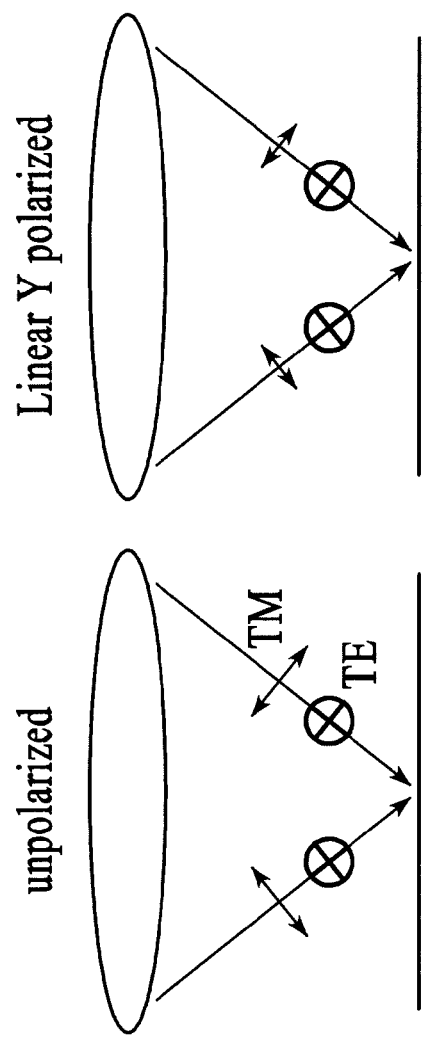
FIG.4c
FIG.4b
FIG.4a

Cut line CD = 60nm

METHOD, PROGRAM PRODUCT AND APPARATUS FOR PERFORMING DOUBLE EXPOSURE LITHOGRAPHY

CROSS-REFERENCE TO RELATED APPLICATIONS

This application is a continuation of U.S. patent application Ser. No. 12/691,552, filed on Jan. 21, 2010, now U.S. Pat. No. 8,122,391, which is a continuation of U.S. patent application Ser. No. 11/402,273, filed on Apr. 12, 2006, now U.S. Pat. No. 7,681,171, which claims priority to U.S. Provisional Application No. 60/670,285, filed on Apr. 12, 2005, all of which are incorporated herein by reference in their entirety.

TECHNICAL FIELD

The technical field of the present invention relates generally to a method, program product and apparatus for performing a double exposure lithography, which utilizes a tri-tone mask and which provides for improved scatter bar trimming

BACKGROUND OF THE INVENTION

Lithographic apparatus can be used, for example, in the manufacture of integrated circuits (ICs). In such a case, the mask may contain a circuit pattern corresponding to an individual layer of the IC, and this pattern can be imaged onto a target portion (e.g., comprising one or more dies) on a substrate (silicon wafer) that has been coated with a layer of radiation-sensitive material (resist). In general, a single wafer will contain a whole network of adjacent target portions that are successively irradiated via the projection system, one at a time. In one type of lithographic projection apparatus, each target portion is irradiated by exposing the entire mask pattern onto the target portion in one go; such an apparatus is commonly referred to as a wafer stepper. In an alternative apparatus, commonly referred to as a step-and-scan apparatus, each target portion is irradiated by progressively scanning the mask pattern under the projection beam in a given reference direction (the "scanning" direction) while synchronously scanning the substrate table parallel or anti-parallel to this direction. Since, in general, the projection system will have a magnification factor M (generally <1), the speed V at which the substrate table is scanned will be a factor M times that at which the mask table is scanned. More information with regard to lithographic devices as described herein can be gleaned, for example, from U.S. Pat. No. 6,046,792, incorporated herein by reference.

In a manufacturing process using a lithographic projection apparatus, a mask pattern is imaged onto a substrate that is at least partially covered by a layer of radiation-sensitive material (resist). Prior to this imaging step, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g., an IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. Eventually, an array of devices will be present on the substrate (wafer). These devices are then separated from one another by a technique such as dicing or sawing, whence the individual devices can be mounted on a carrier, connected to pins, etc.

For the sake of simplicity, the projection system may hereinafter be referred to as the "lens;" however, this term should be broadly interpreted as encompassing various types of projection systems, including refractive optics, reflective optics, and catadioptric systems, for example. The radiation system may also include components operating according to any of these design types for directing, shaping or controlling the projection beam of radiation, and such components may also be referred to below, collectively or singularly, as a "lens." Further, the lithographic apparatus may be of a type having two or more substrate tables (and/or two or more mask tables). In such "multiple stage" devices the additional tables may be used in parallel, or preparatory steps may be carried out on one or more tables while one or more other tables are being used for exposures. Twin stage lithographic apparatus are described, for example, in U.S. Pat. No. 5,969,441, incorporated herein by reference.

The photolithographic masks referred to above comprise geometric patterns corresponding to the circuit components to be integrated onto a silicon wafer. The patterns used to create such masks are generated utilizing CAD (computer-aided design) programs, this process often being referred to as EDA (electronic design automation). Most CAD programs follow a set of predetermined design rules in order to create functional masks. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit.

Of course, one of the goals in integrated circuit fabrication is to faithfully reproduce the original circuit design on the wafer (via the mask). As the critical dimensions of the target patterns become increasingly smaller, it is becoming increasingly harder to reproduce the target patterns on the wafer. However, there are known techniques that allow for a reduction in the minimum CD that can be imaged or reproduced in a wafer. One such technique is the double exposure technique wherein features in the target pattern are imaged in two separate exposures.

For example, one commonly known double exposure technique is dipole illumination. In this technique, during a first exposure the vertical edges of the target pattern (i.e., features) are illuminated and then during a second exposure the horizontal edges of the target pattern are illuminated. As noted, by utilizing two exposures, improved imaging performance may be obtained.

In addition, the use of scattering bars "SB" (or assist features "AF") has become indispensable as chip manufacturers move to more aggressive design rules and lower k, factors in production. The width "d" of the SB can be estimated using the following equation, where ksg is a scaling constant to indicate non-printability or sub-resolution (a typical range of the SB scaling factor $k_{sb}$ is 0.2-0.25):

$$d = k_{sb}(\lambda/NA),$$

where $\lambda$ is the wavelength of the exposure tool, and NA is the numerical aperture of the exposure tool.

In order to maintain $k_1$ above 0.35, manufacturers tend to use a higher NA exposure tool. With the advent of immersion lithography, the NA value can be made greater than 1. Under such hyper NA conditions, SB scalability and printability are becoming a critical issue. FIG. 1a plots the allowable SB width versus the half pitch minimum design rule. The secondary axis is the $k_1$ factor. As indicated by FIG. 1a, as device manufacturers move to lower $k_1$ production, the SB width needs to also scale down accordingly in order to avoid unwanted printing of the SBs. This presents a problem in that at some point the required width of the SB to avoid printing will be smaller than the minimum manufacturable width (i.e., the required SB will be too small to manufacture).

Moreover, as the SB width on reticles becomes smaller than the exposure wavelength, λ, the Kirchoff scalar theory is no longer valid. FIG. 1b illustrates a comparison of a simulated aerial image of an isolated line using 4.85 NA and QUASAR illumination. The SB width on 4× reticle is 60 nm on a BIM (i.e., bright intensity binary mask). Referring to FIG. 1b, comparing the aerial image for rigorous EMF (NA85QS9363rig) versus scalar (NA85QS9363sc1), the EMF aerial image indicates that the SB is actually darker than the scalar image predicted. This suggests that SBs have more optical weight and are therefore more readily/easily printable on wafers. Accordingly, there is a need for a process which addresses the SB scalability and printability and prevents the printing of SBs.

SUMMARY OF THE INVENTION

In view of the foregoing, it is an object of the present invention to provide a double exposure lithography method which trims (i.e., removes) unwanted SB residues from the substrate, that is suitable for use, for example, when printing 65 nm or 45 nm node devices or less.

In summary, the present invention relates to a method of generating complementary masks based on a target pattern having features to be imaged on a substrate for use in a multiple-exposure lithographic imaging process. The method includes the steps of: defining an initial H-mask corresponding to the target pattern; defining an initial V-mask corresponding to the target pattern; identifying horizontal critical features in the H-mask having a width which is less than a predetermined critical width; identifying vertical critical features in the V-mask having a width which is less than a predetermined critical width; assigning a first phase shift and a first percentage transmission to the horizontal critical features, which are to be formed in the H-mask; and assigning a second phase shift and a second percentage transmission to the vertical critical features, which are to be formed in the V-mask. The method further includes the step of assigning chrome to all non-critical features in the H-mask and the V-mask. The non-critical features are those features having a width which is greater than or equal to the predetermined critical width. The non-critical features are formed in the H-mask and the V-mask utilizing chrome. The target pattern is then imaged on the substrate by imaging both the H-mask and V-mask.

The present invention provides important advantages over the prior art. For example, the present invention provides the ability to utilize large SBs due to the mutual trimming of SBs that results from the process of the present invention. Specifically, in the given process, both the H-mask and the V-mask contain circuit features and SBs, but they are in different corresponding orientations, and therefore, there is a mutual SB trimming for the H-mask and V-mask during the two exposures.

Additional advantages of the present invention will become apparent to those skilled in the art from the following detailed description of exemplary embodiments of the present invention.

Although specific reference may be made in this text to the use of the invention in the manufacture of ICs, it should be explicitly understood that the invention has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as being replaced by the more general terms "mask", "substrate" and "target portion", respectively.

The invention itself, together with further objects and advantages, can be better understood by reference to the following detailed description and the accompanying drawings.

BRIEF DESCRIPTION OF THE DRAWINGS

FIGS. 4a-4e illustrate how it is possible to further improve imaging performance by utilizing illumination polarization in combination with the process set forth in the flow chart of FIG. 2.

FIGS. 8a and 8c illustrate an example of resulting resist contours formed using the double exposure technique, while

DETAILED DESCRIPTION OF THE INVENTION

As explained in more detail below, the double exposure technique of the present invention decomposes the target pattern into multiple tri-tone masks, which when illuminated provide for improved scatter bar trimming and improved imaging performance.

Figure 1A:
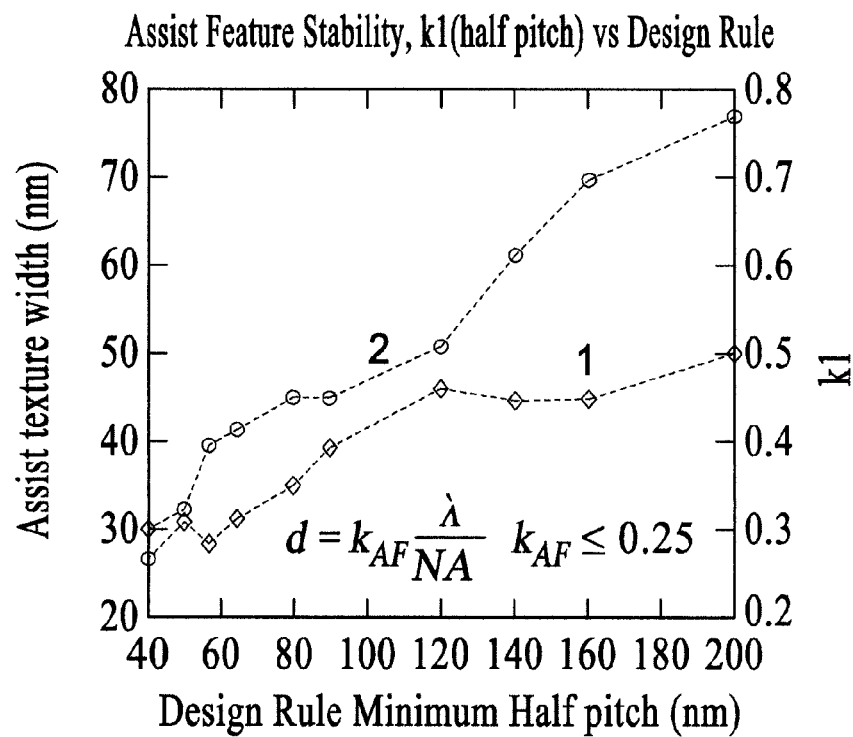
FIG. 1a illustrates a plot of the allowable SB width versus the half pitch minimum design rule.
Figure 1B:
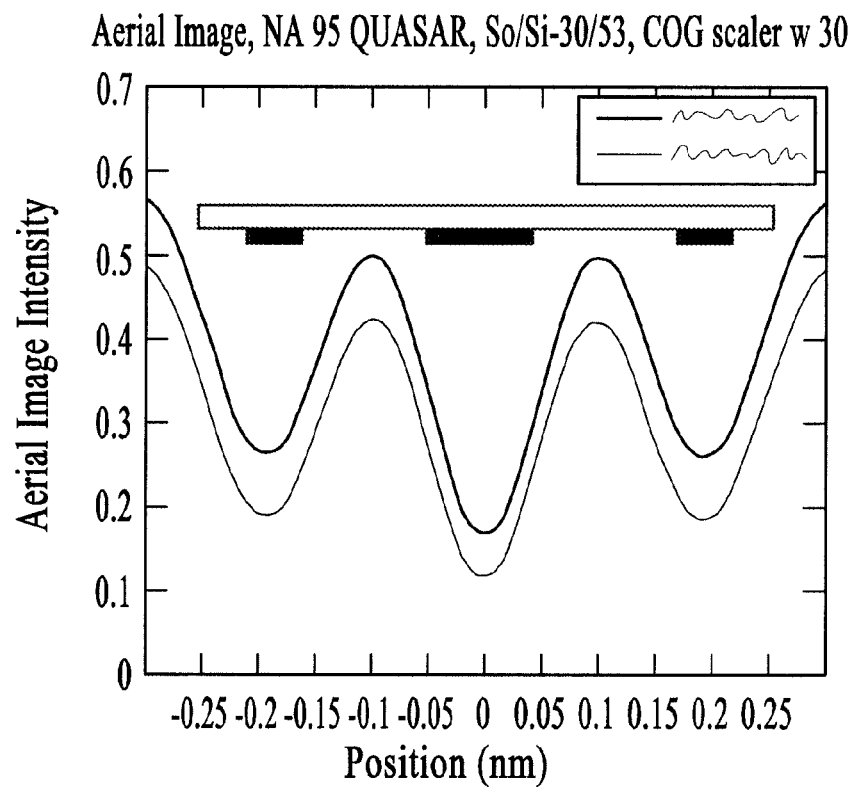
FIG. 1b illustrates a comparison of a simulated aerial image of an isolated line using 0.85 NA and QUASAR illumination.
Figure 2:
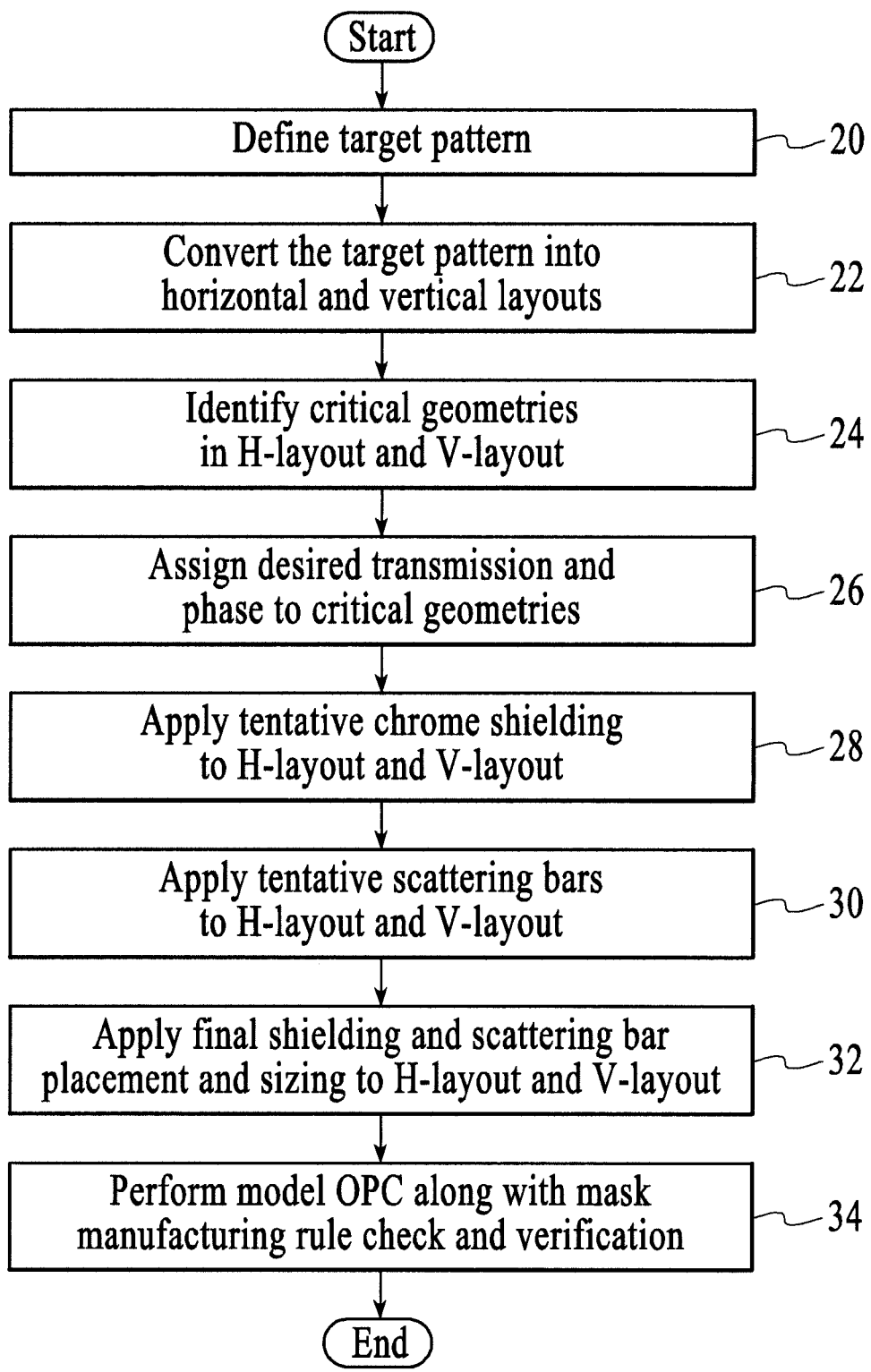
FIG. 2 is an exemplary flowchart illustrating the DEL/DDL layout decomposition method of the present invention.

More specifically, FIG. 2 is a flow-chart illustrating a first embodiment of the present invention. Referring to FIG. 2, the first step (Step 20) in the process is to identify and read in the target pattern which is to be imaged on the substrate (or wafer, etc.). The target pattern can be represented in, for example, GDSII design data or any other suitable data format. The next step (Step 22) is to convert the target pattern into horizontal (H) and vertical (V) layouts, and identify critical geometries (Step 24) in both the horizontal and vertical layouts. It is noted that when separating the target design into H and V layouts, initially the layouts are identical and correspond to the target pattern. However, as explained in further detail below, the H-layout (also referred to as the H-mask) is modified in accordance with the present invention and functions to print the horizontal edges of the target pattern, and the V-layout (also referred to as the V-mask) is modified in accordance with the present invention and functions to print the vertical edges of the target pattern.

Critical geometries are those features having a width dimension less than some predefined amount, which can be determined by the designer based on the imaging system being utilized and the CD tolerance of the target pattern. A geometries operation is utilized to specify features in the H-mask and V-mask which are smaller than a specified/predetermined value to be critical. The critical value is set as a variable which can be changed depending on the design and technology mode being utilized. In other words, for a given process and technology mode (e.g., 45 nm), it becomes more difficult to properly image a feature having a width dimension below a certain value, which in the given invention is referred to as the critical value. As noted, this critical value may vary from process to process as well as for different technology modes.

It is noted that Step 24 can be accomplished using an aerial image model or calibrated model of the imaging system to be utilized to image the target pattern. By utilizing such models, it is possible to simulate how a given feature of the target pattern will be imaged on the substrate, and then based on the results of the simulation, determine the CDs of the features and which features would qualify as critical features. The use of such models is well known in the art, and will not be discussed in further detail herein. It is further noted that the aerial image model or calibrated model can also be utilized to convert the target pattern into horizontal and vertical layouts. This can be accomplished by specifying the treatment edge in the low contrast direction with respect to the illumination dipole X or dipole Y.

Once the critical geometries are identified in both the H-layout and the V-layout, the next step (Step 26) is to assign the desired transmission (e.g., 6% transmission) and phase (e.g., 180 degrees) to each of the critical features in both the H-layout and the V-layout utilizing, for example, attenuated phase-shift material. It is noted that the optimal transmission percentage can be determined utilizing, for example, a transmission tuning technique disclosed in U.S. Pat. No. 7,514,183, which is incorporated herein in its entirety. Of course, it is also acceptable to simply select the desired transmission to be utilized, such as 6%. Further, while 180 degrees is identified as the desired phase shift applied to the critical features, it is also possible to utilize other degrees of phase-shift and therefore the invention should not be deemed as limited to utilizing a 180 degree phase-shift.

It is noted that the transmission and phase assigned to the critical features defines how the critical features will be formed in the respective masks utilizing, for example, the appropriate attenuated phase-shifting material or a chromeless mesa structure. It is further noted that in the given embodiment, the same transmission and phase are applied to all of the critical features to minimize the complexity of the mask making process. However, it is also possible to assign different transmissions and phases to the critical features when doing so would result in improved imaging performance. It is noted that the optimum transmission is NA and pitch dependent.

With regard to the non-critical features in both the H-layout and V-layout (i.e., those features having a width which is greater than the width defining the critical geometries), these features can be imaged utilizing chrome. Of course, if desirable for any reason, such non-critical features could also be imaged utilizing the same phase shifting material utilized to form the critical features.

The next step (Step 28) is to apply tentative chrome shields to the vertical edges in the H-layout and to the horizontal edges in the V-layout. The chrome shields can be applied utilizing, for example, any of the numerous known OPC models or optical models. Once the tentative chrome shields are applied, the next step (Step 30) is to apply tentative SBs to each of the H-layout and V-layout. In the H-layout, the SBs would be placed horizontally extending parallel with the horizontal edges to be imaged, and in the V-layout, the SBs would be placed vertically extending parallel with the vertical edges to be imaged.

It is noted that one of the advantages associated with the present invention is the ability to utilize large SBs due to the mutual trimming of SBs that results from the process of the present invention. Specifically, in the given process, both the I-I-mask and the V-mask contain circuit features and SBs, but they are in different corresponding orientations, and therefore, there is a mutual SB trimming for the H-mask and V-mask during the two exposures. In other words, the background exposure of each exposure is utilized to prevent the SBs in each mask from printing. This process is more efficient than using a dedicated SB trimming exposure for achieving very low $k_1$ printing. Exactly, how large the SBs can be depends in-part on the depth of focus requirements and the given process being utilized. One method of determining the maximum SBs size permitted is to run an initial simulation(s) to determine the maximum allowable SB width that does not result in any SB residual in the final image.

Because there were no SBs present in the respective layouts when initially determining the shielding requirements, in the next step (Step 32), once the tentative SBs are placed in both the H-layout and V-layout, the model for applying shielding is then re-executed so that the optical weight of the SBs can be taken into account with respect to the required/optimal shielding. Similarly, once the shielding is finalized, the OPC program for applying the SBs is re-executed so that the optimal SB can be determined in view of the finalized shielding to be applied to the respective masks.

Once the SBs are finalized, the last step (Step 34) is to perform final model OPC along with mask manufacture rule check and verification. If the respective layouts (i.e., masks) pass the rule check and verification, the process is complete and the H-layout and V-layout represent the masks to be utilized in the double exposure imaging process.

It is noted that the foregoing process is not limited to double dipole illumination. For example, it is also applicable to other types of illumination such as, for example, a customized QUASAR illumination that has a symmetrical pole in either the X (horizontal) or Y (vertical) direction, but asymmetrical from the X to Y direction.

Figure 3A:
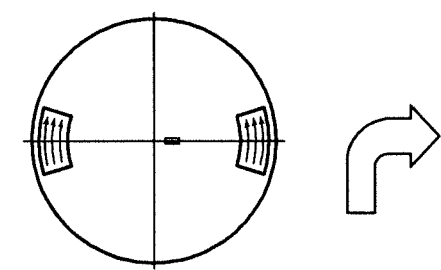
FIGS. 3a-3d illustrate an example of the decomposition of the target pattern (see, FIG. 3a) into an V-layout (see, FIG. 3b) and a H-layout (see, FIG. 3c) in accordance with the method of the present invention and the resulting aerial image (see, FIG. 3d).
Figure 3A:
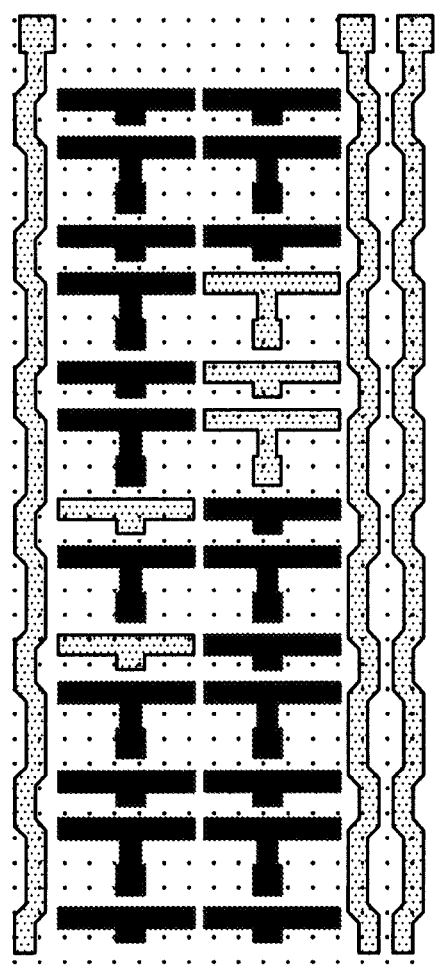
Figure 3A:
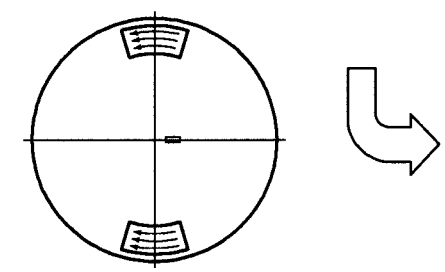
Figure 3C:
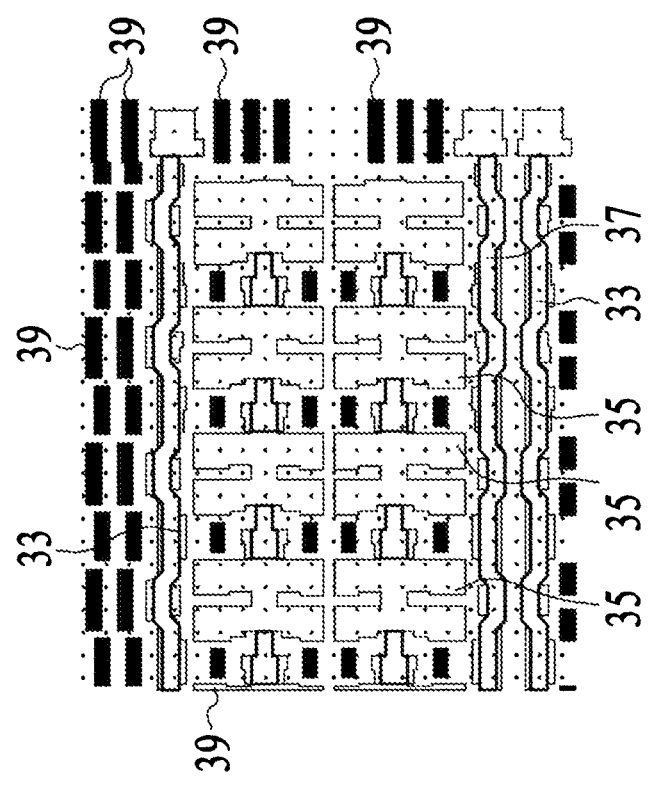
Figure 3B:
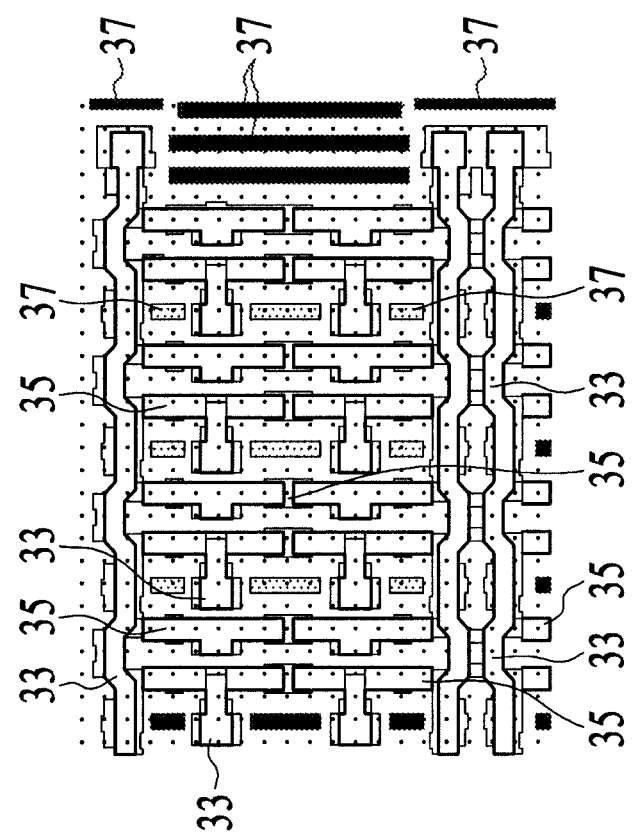
Figure 3D:
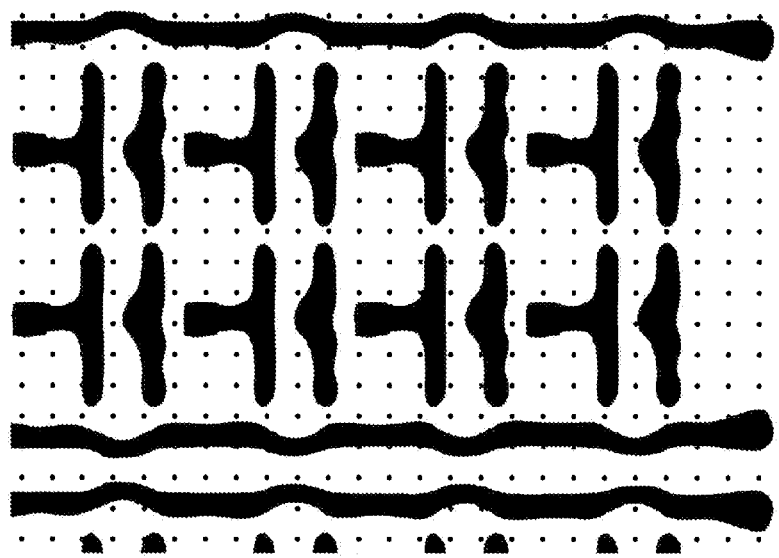

FIGS. 3a-3d illustrate an example of the decomposition of the target pattern (see, FIG. 3a) into an V-layout (see, FIG. 3b) and a H-layout (see, FIG. 3c) in accordance with the method of the present invention and the resulting aerial image (see, FIG. 3d). Referring to FIG. 3b, which is the V-layout, it is shown that the horizontally oriented features 33 are covered with chrome shielding, and the vertical features 35 to be imaged are formed of AttPSM material having 6% transmission and 180 degree phase-shift. The V-layout also includes vertically disposed SBs 37. Similarly, referring to FIG. 3c, which is the H-layout, it is shown that the vertically oriented features 35 are covered with chrome shielding, and the horizontal features 33 to be imaged are formed of AttPSM material having 6% transmission and 180 degree phase-shift. The H-layout also includes horizontally disposed SBs 39. It is noted that all of the vertical features in the V-mask and all of the horizontal features in the H-mask in the foregoing example are formed of AttPSM material, as all of the features have been deemed critical. However, for each feature, the overall imaging performance is obtained as a result of the multiple illumination process, which functions to combine illumination of a critical feature using the AttPSM material in one mask with illumination of the same feature utilizing chrome (i.e., chrome shield) in the other mask. Furthermore, as noted above, for any feature in the target pattern having a width which exceeds the critical dimension, it is possible to form this feature utilizing chrome so as to simply the mask manufacturing process. FIG. 3d illustrates the simulated imaging result.

In one variation of the foregoing embodiment, it is possible to further enhance imaging performance by utilizing the double exposure process of the present invention in conjunction with illumination polarization. More specifically, under high NA and strong off axis illumination conditions, when the pitch is smaller than the wavelength, the angle between the $0^{th}$ and $+/-1^{st}$ order diffraction component is quite large such that the vector effect becomes significant. Linear polarization is an effective way of enhancing the contrast and is relatively simple to implement in exposure systems. As is shown in FIG. 4a, the incomplete interference due to TM (i.e., traverse magnetic wave) can reduce the image contrast. However, as shown in FIG. 4b, by utilizing dipole illumination in combination with a linearly polarized source, the undesirable TM component can be reduced, thereby improving the image contrast. FIG. 4c illustrates that for a 9% AttPSM mask exposed with 0.85 NA, DX with $\sigma_{IN}$=0.68 and $\sigma_{OUT}$=0.93, there is a three times improvement of NILS by applying linear y polarization to the DX source.

Figure 4E:
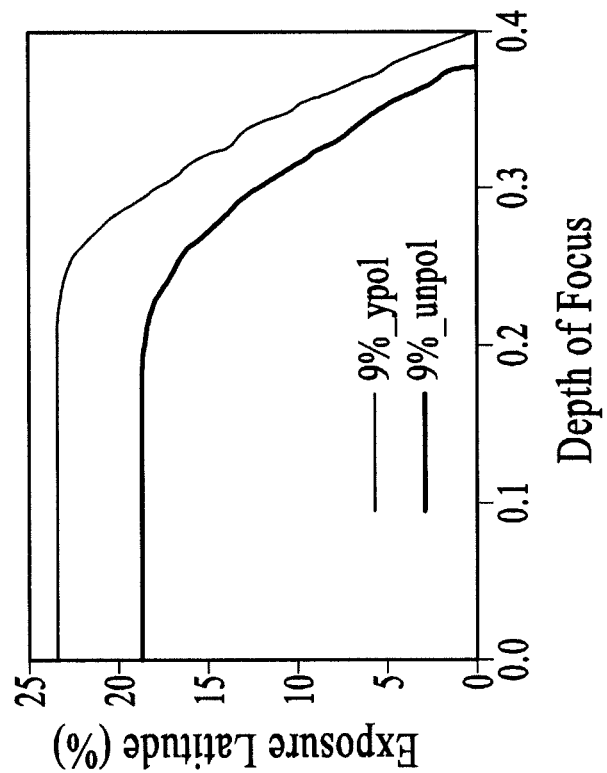
Figure 4D:
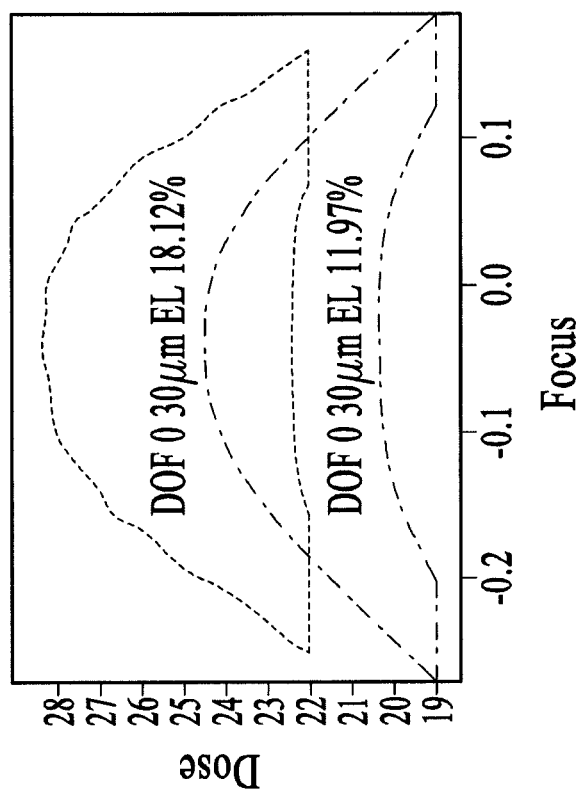

FIG. 4d is an exposure-defocus (ED) plot with and without polarization. It is noted that since linear y-polarized DX has a lower minimum intensity, the ED window has a higher center dose. FIG. 4e illustrates that with the same dipole angle and sigma parameters, by adding linear y polarization, there is an improvement in exposure latitude of 51% for vertical features.

Figures 5A, 5B, 5C:
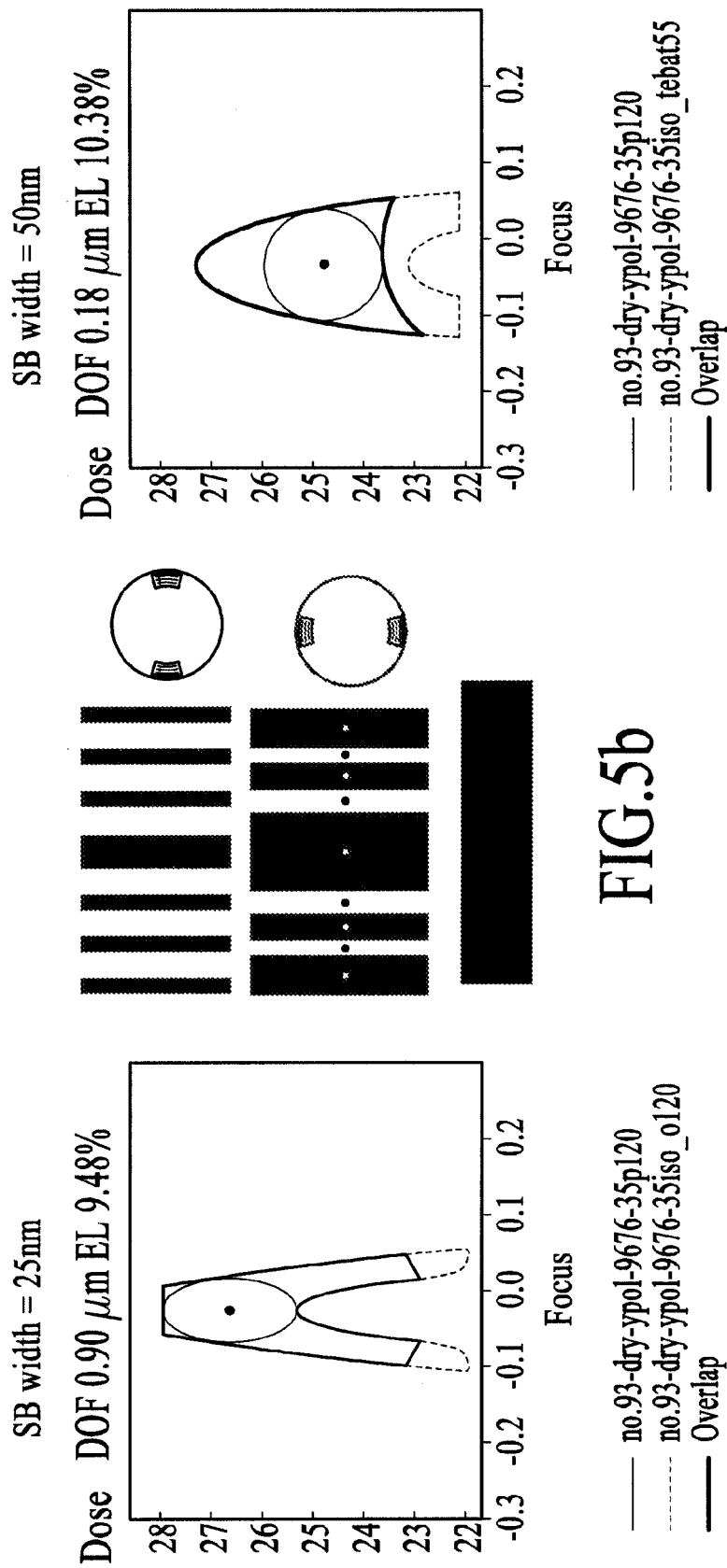
FIGS. 5a-5c illustrate a simulation comparison of the performance of double exposure technique of the present invention for imaging an isolated 45 nm line with varying SB width.

As noted above, the double exposure technique of the present invention provides improved performance over previously known techniques. FIG. 5a is a simulation comparison of the performance of double exposure technique of the present invention for imaging an isolated 45 nm line assuming a 0.93 NA dry exposure system with linear y and x polarization for the DX and DY illuminations, respectively. The DX and DY dipole settings are both $\sigma_{IN}$=0.68 and $\sigma_{out}$=0.93 with a 35 degree pole angle. FIG. 5b illustrates three pairs of SBs placed at the optimum position with their widths varying from 25 nm in FIG. 5a to 50 nm in FIG. 5c.

The simulated FEM plot shows that the full size SBs provide 100% DOF improvement as compared to the 25 nm SB.

Figure 6B:
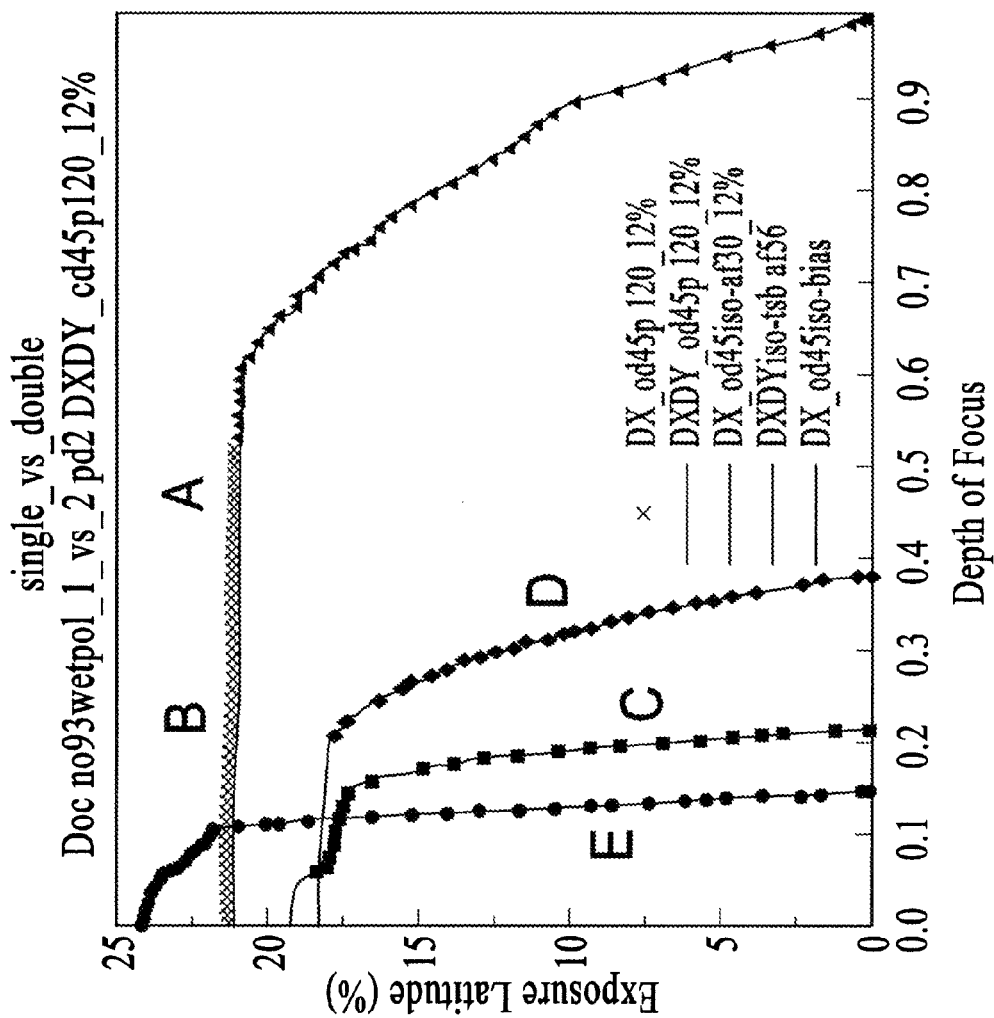
FIGS. 6a and 6b illustrate a comparison between a single exposure process versus the double exposure process for 45 nm dense and isolated lines.
Figure 6A:
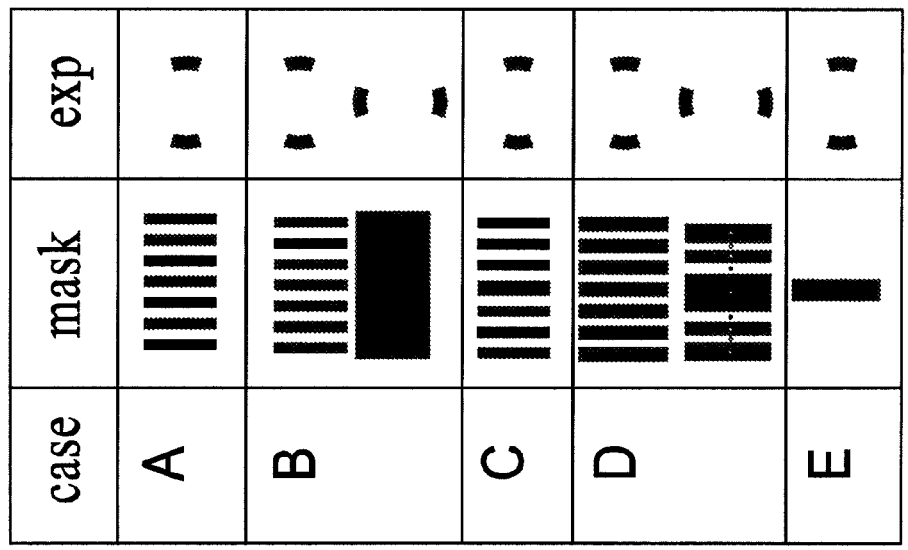

As a practical matter, in order to use ArF to print 45 nm features, it is expected that immersion and polarization will be utilized to improve DOF. FIGS. 6a and 6b compare a single exposure process versus the double exposure process for 45 rim dense and isolated lines. The simulation setting is 0.93 NA, $\sigma_{IN}$=0.76 and $\sigma_{out}$=0.96 for DX single exposure. In the case of double exposure, both DX and DY utilize the same NA and illumination settings. Prolith v9.01 EMF 1 was utilized for all simulations, which included single exposure examples: Case A (dense), Case C (isolated) and Case E (isolated), where the dense pitch is 120 nm, and double exposure examples: Case B (dense) and Case D (isolated). Cases A and B compare the dense line performance for single exposure and double exposure in accordance with the present invention. As shown, with proper shielding, the double exposure has the same process window as the single exposure. For isolated lines with single exposure, Case E, the process window is quite limited. However, Case D utilizing full size 55 nm SB and the double exposure technique shows a significant improvement in DOF.

Figure 7A:
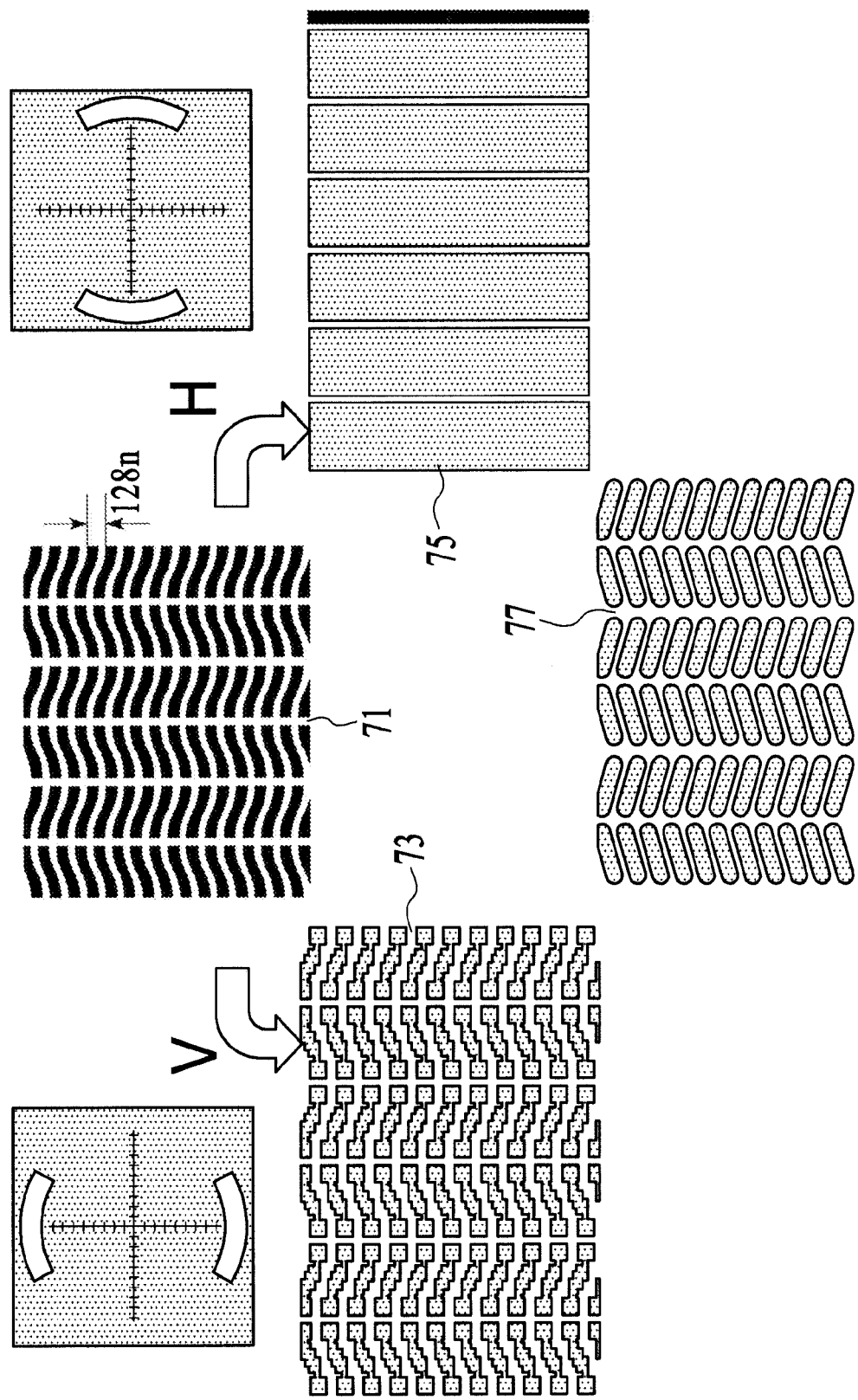
FIGS. 7a and 7b illustrate the use of the DDL/DET technique of the present invention with main feature trimming on the active layer of a DRAM cell.
Figure 7B:
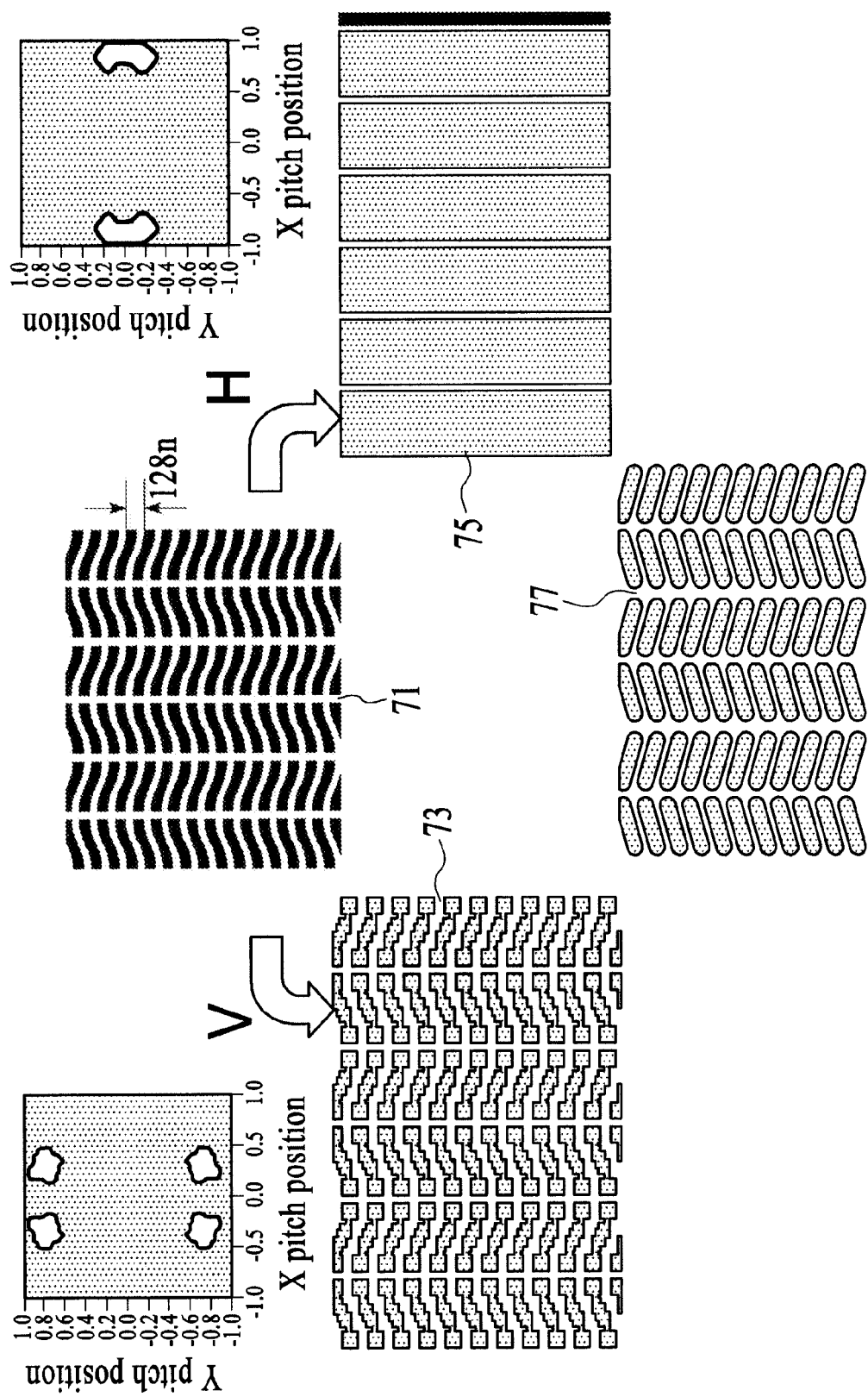
Figure 8B:
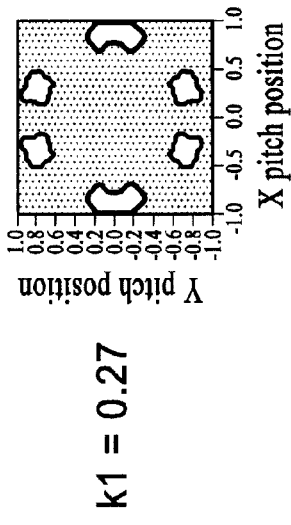
FIGS. 8b and 8d illustrate the resist contours formed using a single exposure technique with an optimized illuminator.
Figure 8B:
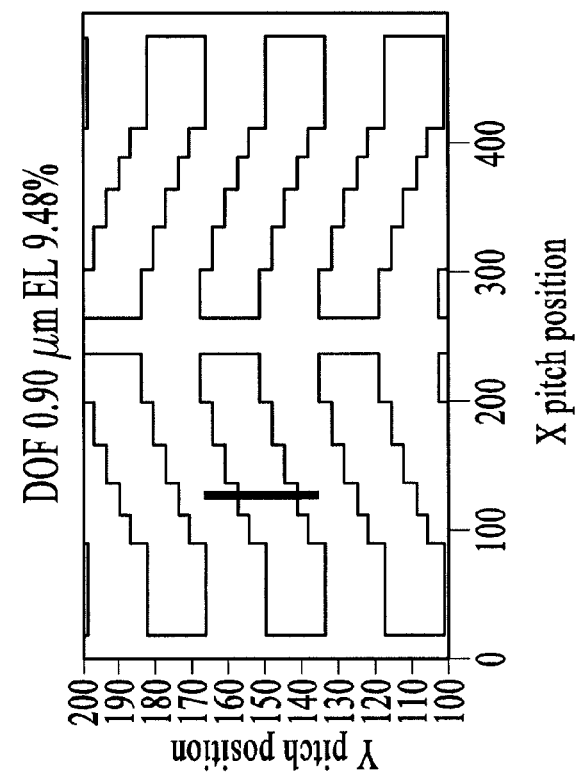
Figure 8A:
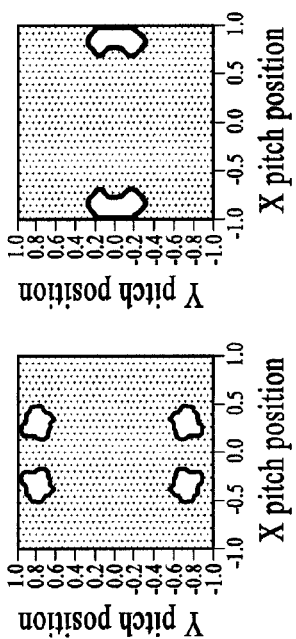
Figure 8A:
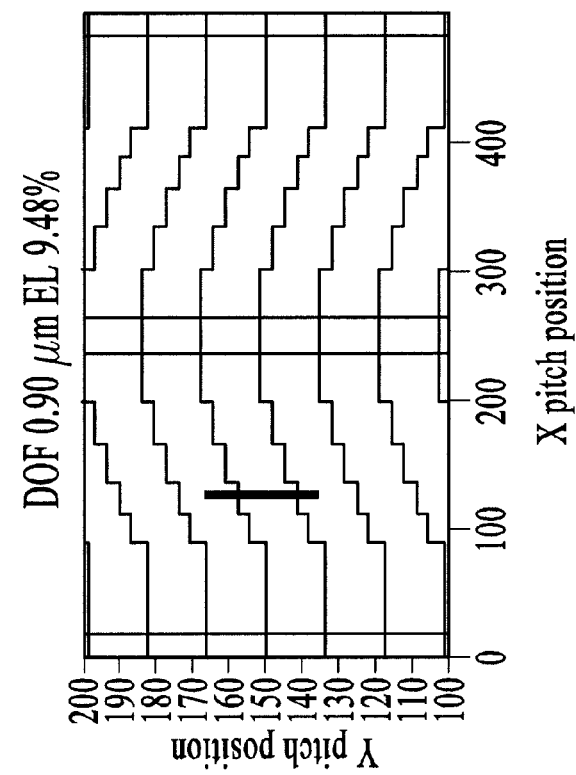
Figure 8D:
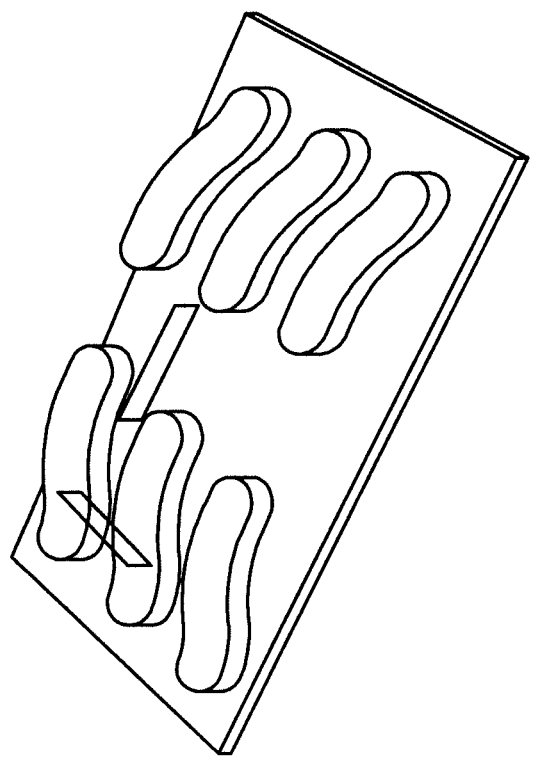
Figure 8C:
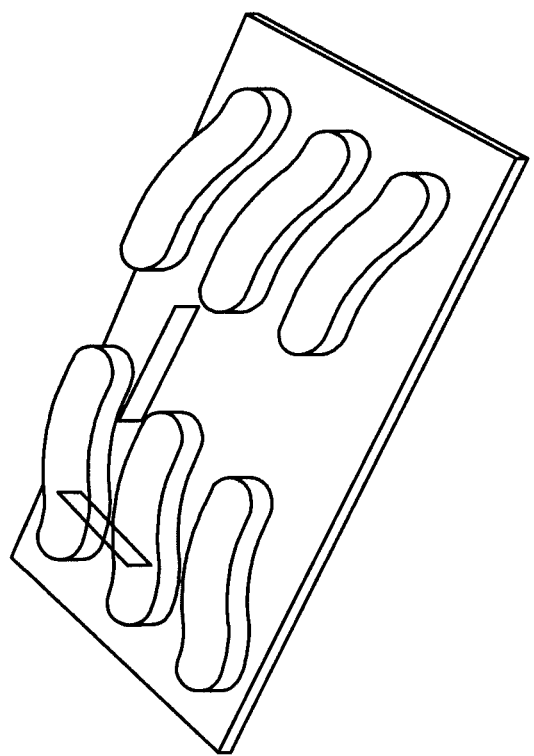
Figure 8E:
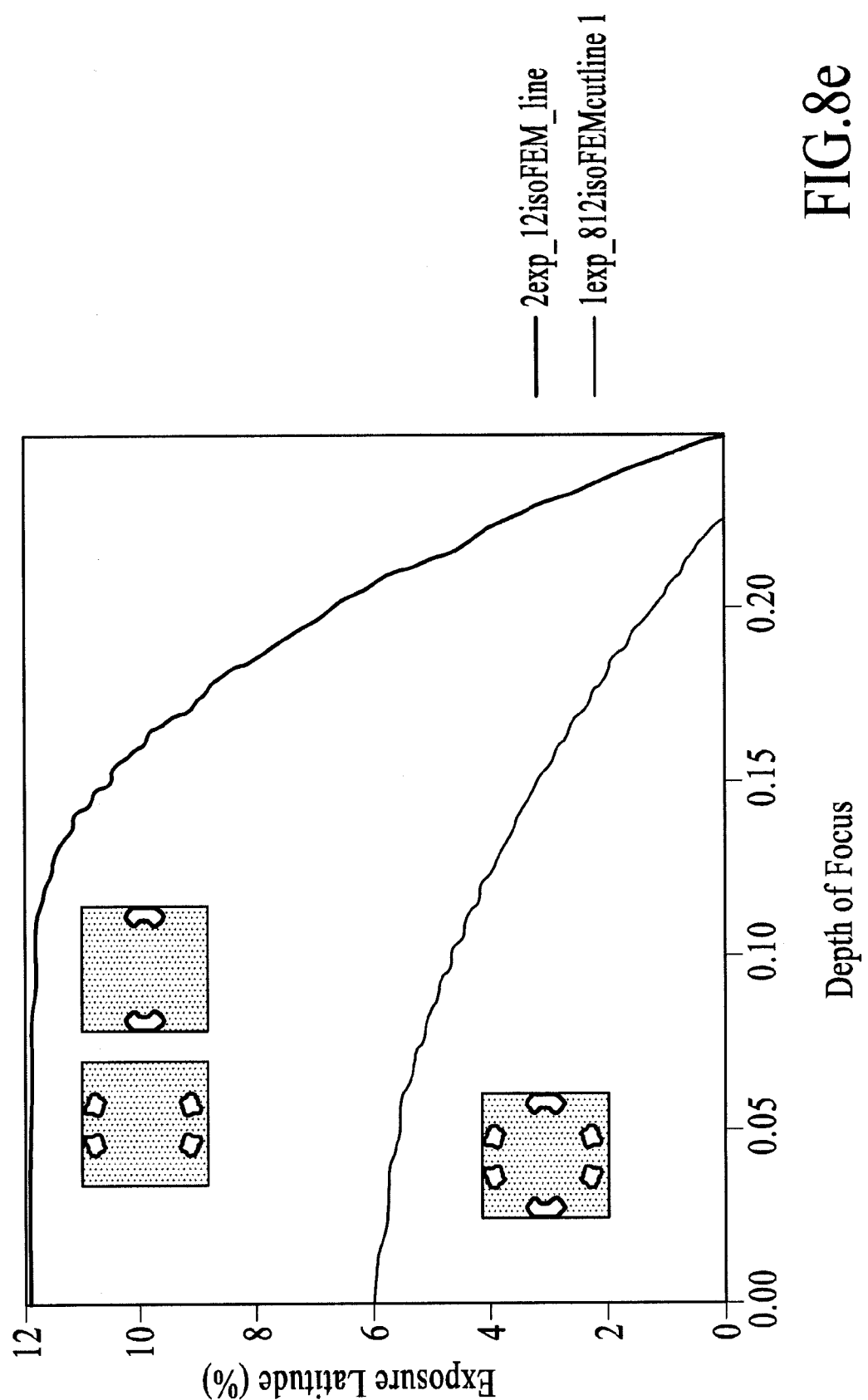
FIG. 8e illustrates the simulated process latitude using 0.85 NA dry without polarization on a cut line across the active area CD.

With regard to another advantage provided by the present invention, it is noted that for some very dense device configurations, printing very small spaces with good control between line ends is necessary. The process of the present invention provides improved process latitude when attempting to print such small spaces. As an example, the DDL/DET technique of the present invention was utilized to print a 6 $F^2$ DRAM core, and the resulting process latitude was compared to that obtained utilizing a single exposure process. FIG. 7a illustrates the use of the DDL/DET technique of the present invention with main feature trimming on the active layer of a DRAM cell, where $k_1$ is 0.28. In this example, two dipole models with 90 degree in DX and DY, respectively, were utilized for converting the original target layout 71 into a 9% AttPSM core pattern 73, and also a BIM trim mask 75 that is utilized to clear the connected resist lines into two separated line ends. The simulated imaging result 77 is also illustrated in FIG. 7a. FIG. 7b illustrates the example DEL with the main feature trimming on the same cell but with a more aggressive $k_1$ of 0.27. In this case, the optimum source for the first exposure is an X-Y asymmetrical QUASAR, and the source for the second exposure is a dipole with a wider $\sigma_{in}$ than $\sigma_{OUT}$. FIGS. 8a and 8c illustrate the resulting resist contours formed using the double exposure technique. FIGS. 8b and 8d illustrate the resist contours formed using a single exposure technique with an optimized illuminator. As shown in the figures, in the single exposure case, there is a severe line-end pullback that requires very aggressive OPC correction due to poor NILS in the line-end. It is quite difficult for the single exposure process to achieve the same print results as the double exposure process. FIG. 8e illustrates the simulated process latitude using 0.85 NA dry without polarization on a cut line across the active area CD. As shown, for 0.18 um DOF, the double exposure process results in a 33% greater exposure latitude as compared to the optimum single exposure.

Variations of the foregoing exemplary embodiments of the present invention are also possible. For example, as already noted above, the double exposure technique of the present invention is not limited to dipole illumination. Different source shapes can be utilized in the two step illumination process. Moreover, the shape of the illumination source for the first illumination may be different from the shape of the illumination source for the second shape.

It is also noted that in an effort to further enhance the imaging results, the SBs are positioned with the masks so as to best match the frequency of the target pattern. Accordingly, in the V-mask, the vertical SBs are positioned so as to best match the frequency of the vertical features to be imaged, and in the H-mask, the horizontal SBs are positioned so as to best match the frequency of the horizontal features to be imaged.

In another variation, it is possible to assign a different phase shift and percentage transmission to the critical features in the H-mask and the V-mask. In addition, it is also possible to assign different phase shifts and percentage transmissions to critical in the same mask (i.e., H-mask or V-mask). For example, features having different widths, all of which are less than the critical dimension, may exhibit improved imaging performance utilizing different phase shifts and/or different transmissions.

In yet another variation, sub-resolution grating blocks are added to the open areas that contain no design features (including SBs) so as to reduce the impact of flare from the imaging system.

Figure 9:
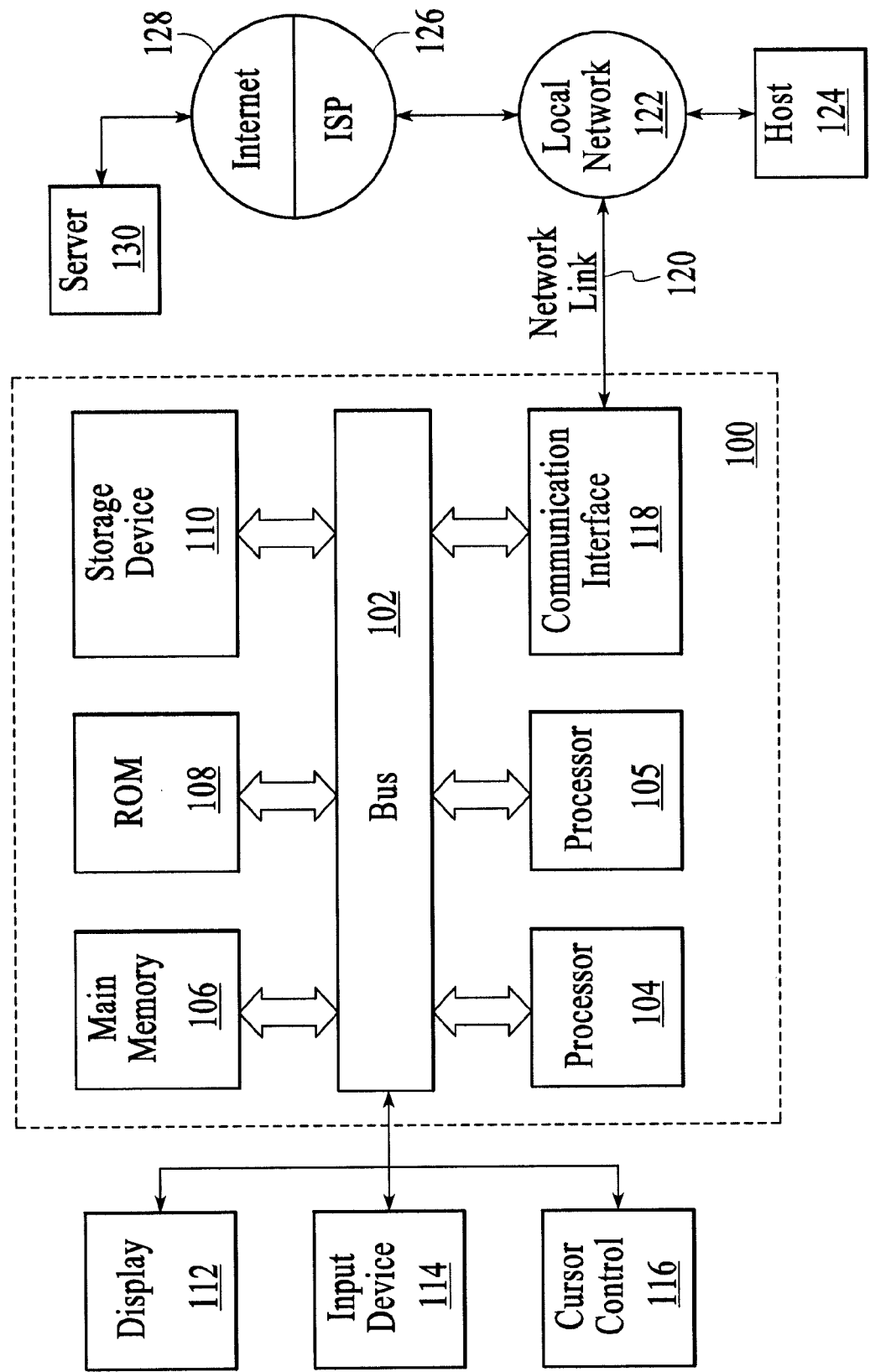
FIG. 9 is a block diagram that illustrates a computer system which can be utilized to execute the method of the present invention and generate files representing the H and V masks.

FIG. 9 is a block diagram that illustrates a computer system 100 which can implement the illumination optimization explained above. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment of the invention, the decomposition process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 10:
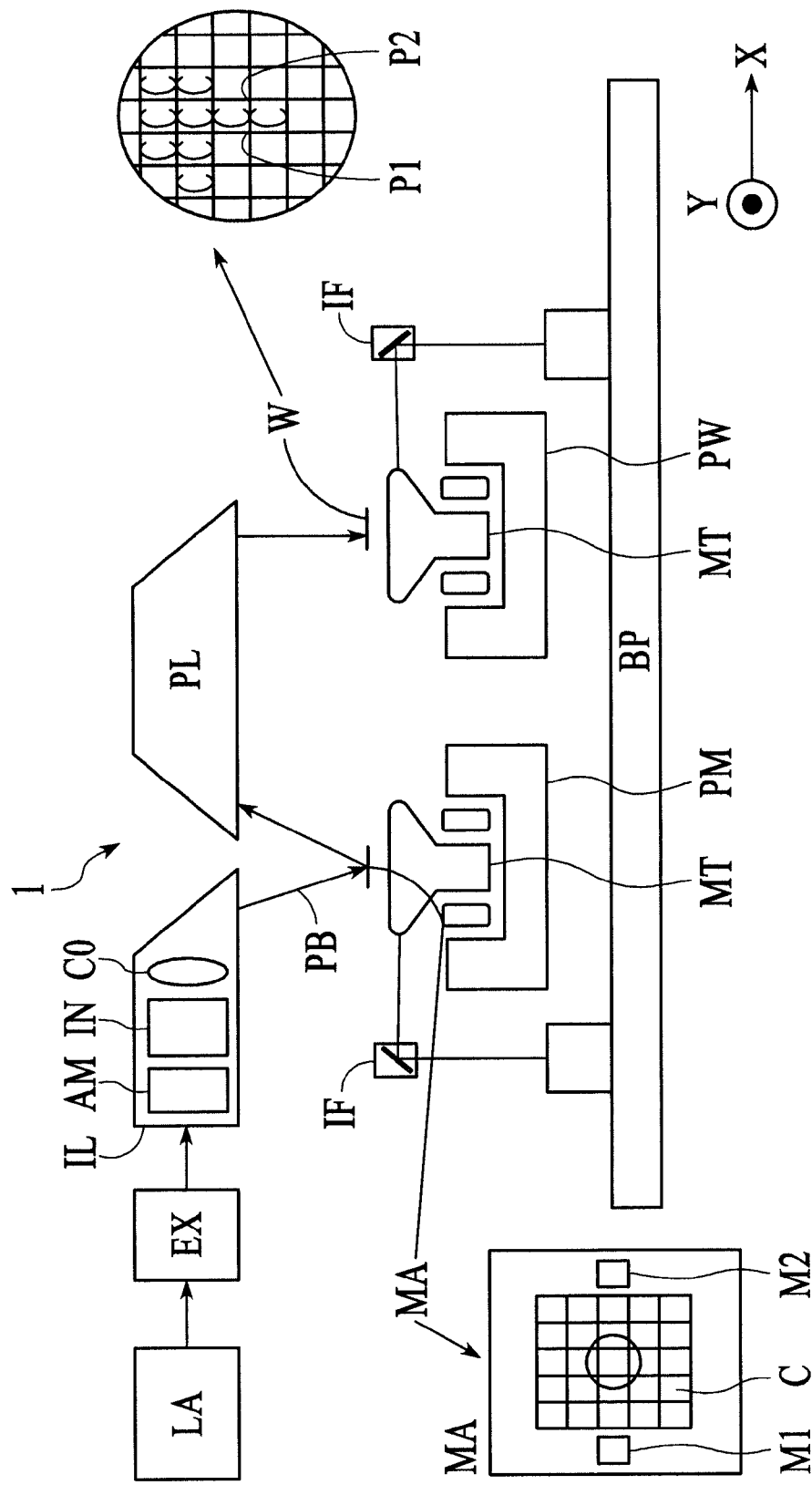
FIG. 10 schematically depicts an exemplary lithographic projection apparatus suitable for use with masks designed with the aid of the disclosed concepts.

FIG. 10 schematically depicts a lithographic projection apparatus suitable for use with a mask designed with the aid of the current invention. The apparatus comprises:

a radiation system Ex, IL, for supplying a projection beam PB of radiation. In this particular case, the radiation system also comprises a radiation source LA;

a first object table (mask table) MT provided with a mask holder for holding a mask MA (e.g., a reticle), and connected to first positioning means for accurately positioning the mask with respect to item PL;

a second object table (substrate table) WT provided with a substrate holder for holding a substrate W (e.g., a resist-coated silicon wafer), and connected to second positioning means for accurately positioning the substrate with respect to item PL;

a projection system ("lens") PL (e.g., a refractive, catoptric or catadioptric optical system) for imaging an irradiated portion of the mask MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning means as an alternative to the use of a mask; examples include a programmable mirror array or LCD matrix.

The source LA (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AM for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam PB impinging on the mask MA has a desired uniformity and intensity distribution in its cross-section.

t should be noted with regard to FIG. 10 that the source LA may be within the housing of the lithographic projection apparatus (as is often the case when the source LA is a mercury lamp, for example), but that it may also be remote from the lithographic projection apparatus, the radiation beam that it produces being led into the apparatus (e.g., with the aid of suitable directing mirrors); this latter scenario is often the case when the source LA is an excimer laser (e.g., based on KrF, ArF or $F_2$ lasing). The current invention encompasses both of these scenarios.

The beam PB subsequently intercepts the mask MA, which is held on a mask table MT. Having traversed the mask MA, the beam PB passes through the lens PL, which focuses the beam PB onto a target portion C of the substrate W. With the aid of the second positioning means (and interferometric measuring means IF), the substrate table WT can be moved accurately, e.g., so as to position different target portions C in the path of the beam PB. Similarly, the first positioning means can be used to accurately position the mask MA with respect to the path of the beam PB, e.g., after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 10. However, in the case of a wafer stepper (as opposed to a step-and-scan tool) the mask table MT may just be connected to a short-stroke actuator, or may be fixed.

The depicted tool can be used in two different modes:

In step mode, the mask table MT is kept essentially stationary, and an entire mask image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the mask table MT is movable in a given direction (the so-called "scan direction", e.g., the y direction) with a speed v, so that the projection beam PB is caused to scan over a mask image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A computer-implemented method, comprising:
    identifying a target pattern having features to be printed in a single layer of an integrated circuit device;
    defining data for a first mask for use with a first exposure in a multiple-exposure lithographic imaging process;
    defining data for a second mask for use with a second exposure in the multiple-exposure lithographic imaging process;
    modifying the data for the first and second masks for respectively causing portions of the target pattern to be imaged during the first and second exposures;
    determining a critical dimension value for features based on certain aspects of the multiple-exposure lithographic imaging process;
    identifying first and second critical features in the modified first and second masks that have dimensions less than the determined critical dimension value;
    determining first and second properties of transmissive mask material to be included in the modified first and second masks, respectively, for the first and second critical features;
    determining, using lithographic models and a computer, an amount of chrome shielding to include in the modified first and second masks; and
    determining, using image simulation by the computer based on the modified first and second masks, a size of scattering bars that can be included in the first and second masks,
    wherein the image simulation takes into account mutual trimming by a background exposure of the first and second exposures.

2. The computer-implemented method of claim 1, wherein modifying includes:

modifying the data for first mask to cause first edges in the target pattern to be imaged; and modifying the data for the second mask to cause second edges in the target pattern to be imaged, wherein the first and second edges extend in substantially different directions.

3. The computer-implemented method of claim 2, wherein the substantially different directions are orthogonal to each other.

4. The computer-implemented method of claim 2, wherein determining the amount of chrome shielding includes considering placement of the chrome shielding in positions corresponding to the first and second edges in the first and second masks, respectively.

5. The computer-implemented method of claim 1, wherein determining the first and second properties includes determining a transmission percentage of the transmissive mask material.

6. The computer-implemented method of claim 1, wherein determining the first and second properties includes determining a phase shift of the transmissive mask material.

7. The computer-implemented method of claim 1, wherein the first and second properties are different.

8. The computer-implemented method of claim 1, wherein the first and second properties are the same for all identified critical features in the first and second masks, respectively.

9. The computer-implemented method of claim 1, wherein the first properties include first values for certain of the identified critical features in the first mask, and wherein the properties include second different values for certain other of the identified features in the first mask.

10. The computer-implemented method of claim 1, further comprising:

determining, using the image simulation, first and second sets of final scattering bars to include in the modified first and second masks, respectively, wherein determining takes into account the first and second sets of final chrome shields included in the modified first and second masks.

11. The computer-implemented method of claim 1, wherein determining the size of the scattering bars includes determining a maximum size of the scattering bars that can be included in the first and second masks that does not result in any residual scattering bar feature appearing in the target pattern imaged during the first and second exposures due to the mutual trimming by the background exposure.

12. The computer-implemented method of claim 11, wherein the mutual trimming accounted for by the image simulation is used to determine the maximum size of the scattering bars.

13. The computer-implemented method of claim 11, wherein the determined maximum size of the scattering bars is a width, and wherein scattering bars included in the first mask have a substantially orthogonal orientation with respect to an orientation of the scattering bars included in the second mask.

* * * * *